United States Patent [19]

Fujii et al.

[11] Patent Number: 4,725,375

[45] Date of Patent: Feb. 16, 1988

[54] ETCHANT COMPOSITION

[75] Inventors: Tsuneo Fujii; Takayuki Deguchi; Sinji Tamaru, all of Osaka, Japan

[73] Assignee: Daikin Industries Ltd., Osaka, Japan

[21] Appl. No.: 908,943

[22] Filed: Sep. 16, 1986

Related U.S. Application Data

[63] Continuation-in-part of Ser. No. 798,407, Nov. 15, 1985, abandoned.

[30] Foreign Application Priority Data

Nov. 17, 1984 [JP] Japan ................... 59-242648

[51] Int. Cl.$^4$ .............. C23F 1/02; B44C 1/22; C03C 15/00; C03C 25/06
[52] U.S. Cl. ................... 252/79.4; 156/656; 156/659.1; 156/664; 252/79.2
[58] Field of Search ............. 252/79.2, 79.3, 79.4; 156/656, 659.1, 664; 134/3, 41

[56] References Cited

U.S. PATENT DOCUMENTS 4,113,486 9/1978 Sato ..................... 156/656 X
4,556,449 12/1985 Nelson ................... 156/659.1

*Primary Examiner*—William A. Powell
*Attorney, Agent, or Firm*—Birch, Stewart, Kolasch & Birch

[57] ABSTRACT

An etchant composition comprising
(a) a cerium (IV) salt,
(b) a nonionic or anionic fluorine-containing surfactant,
(c) water, and
(d) optionally, at least one compound selected from the group consisting of perchloric acid, acetic acid, sulfuric acid, nitric acid and hydrochloric acid and salts thereof, which can homogeneously etch a resist pattern having thin gaps as well as wide gaps on a chrome layer.

9 Claims, No Drawings

ETCHANT COMPOSITION

This application is a continuation-in-part of application Ser. No. 798,407 filed on Nov. 15, 1985, abandoned.

FIELD OF THE INVENTION

The present invention relates to an etchant composition. More particularly, it relates to an etchant composition suitable for use in etching of a chromium or chromium oxide material (hereinafter referred to as "chrome" material).

BACKGROUND OF THE INVENTION

The chrome material is conventionally etched with an aqueous composition comprising a cerium (IV) salt such as ammonium cerium (IV) nitrate [$(NH_4)_2Ce(NO_3)_6$] and cerium (IV) sulfate [$Ce(SO_4)_2$] and optionally perchloric acid, acetic acid, nitric acid and the like. Ratios and concentrations of these components depend on properties of the chrome material such as the oxidation degree of chromium, contents of impurities and a thickness of the chrome material as well as an etching rate. However, such conventional etchant composition is not suitable for use in etching a pattern with very thin gaps.

For example, a chrome mask, which is used for transferring a specific pattern onto a silicon wafer in the production of semiconductor integrated circuit elements, is produced by forming a chrome thin layer on a substrate made of a material which is transparent to visible light, ultraviolet light or far-infrared light to be used for transferring the pattern onto the wafer (e.g. glass and silica) followed by application of a photosensitive agent on the chrome thin layer to form a resist layer, then providing a latent image on the resist layer by irradiation of ultraviolet light, X-ray, an electron beam and the like, developing a designed pattern in the resist layer. Then, the chrome thin layer is etched through the pattern-formed resist layer as a mask so as to transfer the pattern to the chrome layer As the degree of integration of the semiconductor integrated circuit increases, line gaps in the image to be transferred become thinner and thinner. In such circumstance, the conventionally used etchant can hardly penetrate into the thinner gaps formed in the resist layer so that some parts of the chrome layer are not etched.

To overcome such defect of the conventional etchant, there are proposed to add a pretreating step comprising dipping the resist in an organic solvent such as alcohol or an aqueous solution of a surfactant to improve the wettability of the resist (cf. Japanese Patent Kokai Publication (unexamined) No. 62854/1984) or to add an operation comprising vibrating the etchant with ultrasonic wave or agitating the etchant to facilitate the penetration of the etchant into the very thin gaps.

These proposals, however, are not favorable since they increase the number of steps of the etching process, or the etching quality is influenced by the fluctuation of concentration of the etchant. Further, the precisely formed resist image may be damaged, the chrome layer may drop out, or flaws are formed on the chrome layer.

SUMMARY OF THE INVENTION

One object of the present invention is to provide an etchant composition which can be improved in the wettability of the resist layer without deteriorating the properties of the conventional etchant composition comprising a cerium (IV) salt.

Another object of the present invention is to provide an etchant composition which can homogeneously etch the resist pattern having thin gaps as well as wide gaps in the chrome layer.

Further object of the present invention is to provide an etchant composition which does not form any precipitate and maintains its activity after storage.

Accordingly, the present invention provides an etchant composition comprising
(a) a cerium (IV) salt,
(b) a nonionic or anionic fluorine-containing surfactant,
(c) water, and
(d) optionally, at least one compound selected from the group consisting of perchloric acid, acetic acid, sulfuric acid, nitric acid and hydrochloric acid and salts thereof (e.g. alkali metal salts such as sodium salt and potassium salt, and ammonium salt) (hereinafter referred to as "acid component").

A preferred etchant composition according to the present invention comprises
(a) a cerium (IV) salt,
(b) an anionic fluorine-containing surfactant of the formula:

$$Rf'COOX \text{ or } Rf'SO_3X$$

wherein $Rf'$ is a $C_4$–$C_{10}$ perfluoroalkyl or $\omega$-hydroperfluoroalkyl group, and X is a hydrogen atom, an alkali metal (e.g. sodium and potassium) atom or an ammonium group,
(c) water, and
(d) optionally, at least one acid component.

DETAILED DESCRIPTION OF THE INVENTION

The etchant compositions of the present invention may be roughly classified into two kinds:
(A) ones which form precipitate after kept standing for 1 to 7 days but once filtered, do not re-form any precipitate, and
(B) ones which form precipitate after kept standing for 1 to 20 days and even filtered, re-forms precipitate repeatedly.

Those belonging to the kind A are ones containing a surfactant of the formula:

$$Rf'COOX \text{ and } Rf'SO_3X$$

wherein $Rf'$ is the same as defined above.

Among the composition belonging to the kind A, preferred are those having substantially the same surface tension before and after filtration and sufficiently lower surface tension than one containing no surfactant. Preferred surfactants for such compositions are of the formulas:

$$H(CF_2CF_2)_3COOH,$$

$$H(CF_2CF_2)_3COONH_4,$$

$$C_8F_{17}SO_3H, \text{ and}$$

$$C_8F_{17}SO_3NH_4.$$

Those belonging to the kind B can be used before the formation of the precipitate.

For the etchant composition of the invention, the preferred cerium (IV) salt is a cerium (IV) salt of a strong acid or a complex salt of said cerium (IV) salt and an ammonium salt of the strong acid. Specific examples of the cerium (IV) salt are cerium (IV) sulfate, cerium (IV) nitrate, ammonium cerium (IV) sulfate, ammonium cerium (IV) nitrate and mixtures thereof.

The amount of the cerium (IV) salt to be added in the etchant composition of the invention is generally from 10 to 300 g per liter of water.

The acid component is optionally added to the composition. When it is used, its amount to be added is up to 120 g per liter of water.

The fluorine-containing surfactant to be used according to the present invention may be any one of conventional nonionic and anionic fluorine-containing surfactants.

Preferred are those having at least one of functional groups of the formulas: —O—, —OH, —COO—, —COOH, —SO$_4$, —SO$_3$—, and —PO$_4$<.

Specific examples of the surfactant preferably used according to the present invention are:

---

Nonionic ones

RfAOH,
RfACH(OR$^1$)CH$_2$OQ$_n$R$^2$,
RfBN(R$^3$)(C$_2$H$_4$O)$_n$H,
RfACH(OR$^1$)CH$_2$OQ$_n$CH$_2$CH(OR$^1$)ARf,

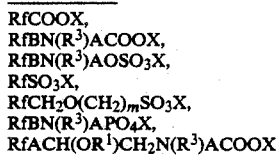

Anionic ones

RfCOOX,
RfBN(R$^3$)ACOOX,
RfBN(R$^3$)AOSO$_3$X,
RfSO$_3$X,
RfCH$_2$O(CH$_2$)$_m$SO$_3$X,
RfBN(R$^3$)APO$_4$X,
RfACH(OR$^1$)CH$_2$N(R$^3$)ACOOX

--- wherein X is the same as defined above; Rf is a C$_3$–C$_{21}$ fluoro-aliphatic group a carbon-carbon bonding of which may be interrupted by an oxygen atom; A is a group of the formula: —(CH$_2$)$_p$—, —[CH$_2$—CH(CH$_3$)-]$_p$— or —[CH$_2$—CH(OY)—CH$_2$]— in which Y is a hydrogen atom or a C$_1$–C$_3$ acyl group and p is an integer of 1 to 10; B is —CO— or —SO$_2$—; R$^1$ is a hydrogen atom or a C$_1$–C$_5$ acyl group; R$^2$ is a hydrogen atom or a substituted (with, for example, a C$_1$–C$_4$ alkyl group) or unsubstituted aromatic group (e.g. a phenyl group) or alkyl group having, for example, 1 to 4 carbon atoms; R$^3$ is a hydrogen atom or a C$_1$–C$_4$ alkyl group; R$^4$ is a C$_1$–C$_4$ alkyl group; Q is a group of the formula: —C$_2$H$_4$O— or —CH(CH$_3$)CH$_2$O—; n is an integer of 6 to 22; and m is an integer of 1 to 10. In the above formulas, the fluoro-aliphatic group may be a saturated or unsaturated, straight or branched one, preferably a perfluoroalkyl group, ω-hydroperfluoroalkyl group and a group of the formula:

C$_3$F$_7$OCF(CF$_3$)CF$_2$O(CH$_2$CF$_2$CF$_2$O)$_u$CH$_2$CF$_2$— wherein u is an integer of 1 to 4.

The fluorine-containing surfactants may be used alone or as a mixture thereof.

The amount of the surfactant to be added is from 0.00001 to 10% by weight, preferably from 0.001 to 1.0% by weight, especially not more than 0.1% by weight based on the whole weight of the etchant composition. When the amount of the surfactant is less than the above lower limit, the effect of the addition of the surfactant is not achieved. When it is larger than the above upper limit, the surfactant does not exert its effect in proportion to the increased amount of the surfactant, this being uneconomical.

The etchant composition of the invention may be prepared by only mixing all the components, and the order of the addition of the components is not critical. For example, an aqueous solution of the surfactant is added to an aqueous solution of the the cerium (IV) salt and the optional acid component. When the precipitate is formed in the composition after kept standing for 1 to 7 days, it is removed by filtering it off. The precipitate does not materially influence the composition, etching activity and surface tension of the etchant composition since its amount is very slight.

In addition to the above components, the etchant composition may contain any component that does not adversely affect the activity of the cerium (IV) salt. Examples of such additional component are water-soluble organic solvents such as alcohols (e.g. methanol, ethanol, butanol and the like) and ketones (e.g. acetone, methyl ethyl ketone, methyl isobutyl ketone and the like).

The present invention will be hereinafter explained further in detail by following examples.

EXAMPLE 1

An etchant composition was prepared by mixing the following base composition with a 0.5% aqueous solution of a surfactant listed in Table 1 to its final concentration of 0.01% by weight:

| Base Composition | |
|---|---|
| Ammonium cerium (IV) nitrate | 165 g |
| Perchloric acid (70%) | 40 ml |
| Water | 1 l |

(Surface tension, 72–75 dyne/cm at 25° C.).

A surface tension at 25° C. of the etchant composition and a period of time till the start of the precipitation (storage time) are shown in Table 1.

TABLE 1

| Surfactant | Surface tension (dyne/cm) | Storage time (days) |
|---|---|---|
| Unidain DS-401(*1) | 27.8 | 4 |
| Unidain DS-401-A(*1) | 20.7 | 2 |
| Unidain DS-402(*1) | 35.0 | 20 |
| Unidain DS-101(*2) | 50.0 | 2 |
| C$_3$F$_7$OCF(CF$_3$)CF$_2$O—(CH$_2$CF$_2$CF$_2$O)$_n$—CH$_2$CF$_2$COOK | 45.0 | 14 |
| Unidain DS-102(*2) | 35.0 | 2 |
| Unidain DS-403(*1) | 20.0 | 2 |
| Unidain DS-501(*3) | 40.0 | 3 |
| Unidain DS-502(*4) | 40.0 | 3 |

Note:
(*1)Perfluoroalkylethyleneoxide adduct (manufactured by Daikin Industries Ltd.).
(*2)Perfluoroalkylcarboxylate salt (manufactured by Daikin Industries Ltd.).
(*3)Perfluoroalkyl ether (manufactured by Daikin Industries Ltd.).
(*4)Perfluoroalkyl acetal (manufactured by Daikin Industries Ltd.).

EXAMPLE 2

An etchant composition was prepared by mixing the following base composition with a 0.5% aqueous solution of a fluorine-containing surfactant listed in Table 2 to its final concentration of 0.01% by weight:

| Base Composition | |
|---|---|
| Ammonium cerium (IV) nitrate | 165 g |
| Perchloric acid (70%) | 40 ml |
| Water | 1 l |

(Surface tension, 72–75 dyne/cm at 25° C.).

A surface tension at 25° C. of the etchant composition and a period of time till the start of the precipitation (storage time) are shown in Table 2.

TABLE 2

| Surfactant | Surface tension (dynes/cm) | Storage time (days) |
|---|---|---|
| $C_2F_5(CF_2CF_2)_sCH_2(OH)-$ 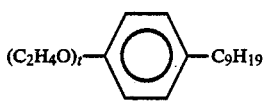 (s = av. 3.5, t = av. 10) | 37.5 | 14 |
| $(CF_3)_2CF(C_2F_4)_sCH_2CH(OH)-$ $CH_2O(C_2H_4O)_tCH_3$ (s = av. 3.5, t = av. 8) | 25.0 | 2 |
| $(CF_3)_2CF(C_2F_4)_sCH_2CH(OH)-$ $CH_2O(C_2H_4O)_tH$ (s = av. 3.5, t = av. 15) | 22.5 | 2 |
| $(CF_3)_2CF(C_2F_4)_sCH_2CH(OH)-$ $CH_2O[CH(CH_3)CH_2O]_2CH_2-$ $CH(OH)CH_2(C_2H_4O)_sCF(CF_3)_2$ (s = av. 3.5) | 40.0 | 2 |
| $C_2F_5(C_2F_4)_sCH_2CH\underset{\underset{\underset{CH_3\ \ CH_3}{C}}{O\ \ \ \ O}}{\text{———}}CH_2$ (s = av. 3.5) | 40.0 | 2 |
| $C_2F_5(C_2F_4)_sCH_2CH(OH)CH_2-$ $N(CH_3)CH_2COOK$ (s = av. 3.5) | 35.0 | 2 |

EXAMPLE 3

An etchant composition having a following composition was prepared and examined for its surface tension (at 25° C.) and storage time.

| Composition I | |
|---|---|
| Ammonium cerium (IV) nitrate | 20 g |
| Cerium (IV) nitrate.hydrate | 40 g |
| Nitric acid (60%) | 120 ml |
| Water | 1 l |
| $C_3F_7OCF(CF_3)CF_2O-(CH_2CF_2CF_2O)_n-$ $CH_2CF_2COOK$ (n = av. 3.5) | 0.01 wt % |
| Surface tension | 45 dyne/cm |
| Storage time | >20 days. |
| Composition II | |
| Cerium (IV) nitrate.hydrate | 20 g |
| Nitric acid (60%) | 40 ml |
| Water | 1 l |
| Unidain DS-402 | 0.01 wt % |
| Surface tension | 35 dyne/cm |
| Storage time | >20 days. |
| Composition III | |
| Ammonium cerium (IV) nitrate | 165 g |
| Perchloric acid (70%) | 40 ml |
| Nitric acid (60%) | 80 ml |
| Water | 1 l |
| Unidain DS-402 | 100 ppm |
| Surface tension | 50–60 dyne/cm |
| Storage time | 15 days. |
| Composition IV | |
| Ammonium cerium (IV) nitrate | 165 g |
| Perchloric acid (70%) | 40 ml |
| Nitric acid (60%) | 40 ml |
| Water | 1 l |
| $C_3F_7OCF(CF_3)CF_2O-(CH_2CF_2O)_n-$ $CH_2CF_2COOK$ (n = av. 3.5) | 100 ppm |
| Surface tension | 50–60 dyne/cm |
| Storage time | 15 days. |
| Composition V | |
| Cerium (IV) nitrate.hydrate | 20 g |
| Nitric acid (60%) | 40 ml |
| Water | 1 l |
| $C_2F_5(C_2F_4)_sCH_2CH(OH)-$ 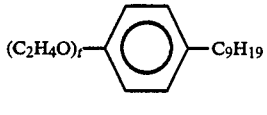 (s = av. 3.5, t = av. 10) | 100 ppm |
| Surface tension | 35 dyne/cm |
| Storage time | >20 days. |
| Composition VI | |
| Ammonium cerium (IV) nitrate | 165 g |
| Perchloric acid (70%) | 40 ml |
| Nitric acid (60%) | 80 ml |
| Water | 1 l |
| $C_2F_5(C_2F_4)_sCH_2CH(OH)-$ 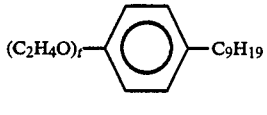 (s = av. 3.5, t = av. 10) | 100 ppm |
| Surface tension | 50–60 dyne/cm |
| Storage time | 15 days. |

EXAMPLE 4

An etchant composition was prepared by mixing the following base composition with a 0.5% aqueous solution of a surfactant listed in Table 3 to a predetermined final concentration:

| Base Composition | |
|---|---|
| Ammonium cerium (IV) nitrate | 165 g |
| Perchloric acid (70%) | 40 ml |
| Water | 1 l |

(Surface tension, 72–75 dyne/cm at 25° C.).

The prepared etchant composition was kept standing for three days and filtered out the precipitate to give an etchant composition.

A surface tension at 25° C. of the filtered etchant composition and a period of time till the start of the precipitation (storage time) after preparation and after filtration are shown in Table 3.

TABLE 3

| Surfactant | | After preparation | | After filtration | |
|---|---|---|---|---|---|
| Compound | conc. (wt %) | Surface tension (dyne/cm) | Storage time (days) | Surface tension (dyne/cm) | Storage time (days) |
| $H(CF_2CF_2)_2COOH$ | 0.005 | 73 | >7 | 73 | 40 |
| | 0.010 | 71 | >7 | 72 | 40 |
| | 0.015 | 70 | >7 | 74 | 40 |
| $H(CF_2CF_2)_3COOH$ | 0.005 | 65 | 3 | 65 | >60 |
| | 0.010 | 58 | 1 | 59 | >60 |
| | 0.015 | 50 | 1 | 49 | >60 |
| $H(CF_2CF_2)_4COOH$ | 0.005 | 49 | 3 | 56 | 40 |
| | 0.010 | 48 | 1 | 60 | 40 |
| | 0.015 | 55 | 1 | 63 | 40 |
| $C_7F_{15}COOH$ | 0.005 | 47 | 3 | 55 | 30 |
| | 0.010 | 45 | 1 | 65 | 30 |
| | 0.015 | 46 | 1 | 57 | 30 |
| $C_{10}F_{21}COOH$ | 0.005 | 59 | 1 | 65 | 30 |
| | 0.010 | 58 | 1 | 61 | 30 |
| | 0.015 | 58 | 1 | 60 | 30 |
| $C_8F_{17}SO_3H$ | 0.005 | 31 | 3 | 31 | >60 |
| | 0.010 | 30 | 1 | 30 | >60 |
| | 0.015 | 28 | 1 | 27 | >60 |
| $H(CF_2CF_2)_2COONH_4$ | 0.005 | 54 | 7 | 58 | >60 |
| | 0.010 | 46 | 7 | 51 | >60 |
| | 0.015 | 44 | 3 | 48 | >60 |
| $C_7F_{15}COONH_4$ | 0.005 | 43 | 7 | 58 | 30 |
| | 0.010 | 46 | 3 | 51 | 30 |
| | 0.015 | 45 | 3 | 48 | 30 |
| $C_8F_{17}SO_3NH_4$ | 0.005 | 34 | 7 | 36 | >60 |
| | 0.010 | 31 | 3 | 33 | >60 |
| | 0.015 | 29 | 3 | 30 | >60 |

EXAMPLE 5 AND COMPARATIVE EXAMPLE 1

A chromium film of 500 Å in thickness and a chromium oxide film of 500 Å in thickness successively formed on a mask substrate were coated with Fluororesist FBM-120 (a solution of a copolymer of 99% by weight of 2,2,3,4,4,4-hexafluorobutyl methacrylate and 1% by weight of glycidyl methacrylate manufactured by Daikin Industries Ltd.) by means of a spinner with a thickness of 5,000 Å, in which fine pattern having gaps of 0.5 μm and 1.0 μm, respectively were drawn up an electron beam radiating equipment. After pretreatment with isopropanol, the patterns were developed with a developing agent comprising ethanol and isobutanol to form resist patterns. Then, it was rinsed with isopropanol and post-baked at 80° C. for 15 minutes followed by etching with an etchant composition having the following composition:

| Composition | |
|---|---|
| Ammonium cerium (IV) nitrate | 165 g |
| Perchloric acid (70%) | 40 ml |
| Water | 1 l |
| Unidain DS-402 | 0.01 wt % |

(Surface tension, 40 dyne/cm at 25° C.).

For comparison, the same procedures as above were repeated but using an etchant composition having the following composition:

| Composition | |
|---|---|
| Ammonium cerium (IV) nitrate | 165 g |
| Perchloric acid (70%) | 40 ml |
| Water | 1 l |

(Surface tension, 75 dyne/cm at 25° C.).

The produced etching patterns were observed.

In Example 5, since the etchant composition contained the fluorine-containing surfactant, the surface tension of the composition was reduced so that its wettability with and penetration ability into the gaps in the resist film were improved. Therefore, the fine patterns having the gaps of 0.5 μm and 1.0 μm were precisely and homogeneously etched so that all the portions of which were etched. The etching could be carried out with good reproducibility.

On the contrary, in case of the comparative experiment, the etchant composition had large surface tension so that its wettability and penetrating ability were very poor. Thus, the nonuniformity was observed, and the number of portions not etched 30 portions/cm².

EXAMPLES 6–8 AND COMPARATIVE EXAMPLES 2–3

A mask substrate having a chromium film and a chromium oxide film formed on the chromium film (AMFR 2509 (P) LR manufactured by Ulvac Coating Corp.) was coated with the same resist as used in Example 5 by means of a spinner with a thickness of 5,000 Å, in which a pattern consisting of 400 through-holes of each 2 μm square and a pattern consisting of 400 through-holes of each 5 μm square were drawn by an electron beam radiating equipment. After pretreatment with isopropanol, the patterns were developed with a developing agent comprising ethanol and isobutanol to form resist patterns. Then, it was rinsed with isopropanol and post-baked at 80° C. for 15 minutes and descumed by a reactive ion etching equipment at 100 W of high frequency output for 20 seconds followed by etching with an etchant composition having the composition shown in Table 4.

Then, the number of the through-holes which were not etched was counted by means of an optical microscope. The results are listed in Table 4.

TABLE 4

| Example No. | 6 | 7 | C.2 | 8 | C.3 |
| --- | --- | --- | --- | --- | --- |
| Ammonium cerium (V) nitrate | 165 | 165 | 165 | 165 | 165 |
| Perchloric acid (70%) | 40 | 40 | 40 | 0 | 0 |
| Surfactant (g) | H(CF$_2$CF$_2$)$_3$COOH (0.01) | C$_8$F$_{17}$SO$_3$H (0.005) | — | H(CF$_2$CF$_2$)$_3$COOH (0.02) | — |
| Water (liter) | 1 | 1 | 1 | 1 | 1 |
| Surface tension (dyne/cm) | 58 | 43 | 75 | 34 | 74 |
| Etching time (sec.) | 65 | 50 | 65 | 39 | 65 |
| Number of unetched  2 μm | 0 | 0 | 10 | 0 | 13 |
| through-holes        5 μm | 0 | 0 | 5 | 0 | 7 |

What is claimed is:

1. An etchant composition comprising
   (a) a cerium (IV) salt,
   (b) at least one nonionic or anionic fluorine-containing surfactant,
   (c) water, and
   (d) optionally, at least one compound selected from the group consisting of perchloric acid, acetic acid, sulfuric acid, nitric acid and hydrochloric acid and salts thereof.

2. An etchant composition, where in the fluorine-containing surfactant is at least one having at least one functional group selected from the group consisting of —O—, —OH, —COO—, —COOH, —SO$_4$, —SO$_3$— and —PO$_4$<.

3. An etchant composition according to claim 2, wherein the fluorine containing surfactant is at least one selected from the group consisting of
   RfAOH,
   RfACH(OR$^1$)CH$_2$OQ$_n$R$^2$,
   RfBN(R$^3$)(C$_2$H$_4$O)$_n$H,
   RfACH(OR$^1$)CH$_2$OQ$_n$CH$_2$CH(OR$^1$)ARf, $$\text{RfCH}_2\text{CH}\underset{\underset{\underset{R^4}{}}{C}}{\overset{O\quad O}{\diagdown\diagup}}\text{CH}_2$$

RfCOOX,
   RfBN(R$^3$)ACOOX,
   RfBN(R$^3$)AOSO$_3$X,
   RfSO$_3$X,
   RfCH$_2$O(CH$_2$)$_m$SO$_3$X,
   RfBN(R$^3$)APO$_4$X,
   RfACH(OR$^1$)CH$_2$N(R$^3$)ACOOX wherein Rf is a C$_3$-C$_{21}$ fluoro-aliphatic group a carbon-carbon bonding of which may be interrupted by an oxygen atom; A is a group of the formula: —(CH$_2$)$_p$—, —[CH$_2$—CH(CH$_3$)]$_p$— or —[CH$_2$—CH(OY)—CH$_2$]— in which Y is a hydrogen atom or a C$_1$-C$_3$ acyl group and p is a integer of 1 to 10; B is —CO— or —SO$_2$—; R$^1$ is a hydrogen atom or a C$_1$-C$_5$ acyl group; R$^2$ is a hydrogen atom or a substituted or unsubstituted aromatic or alkyl group; R$^3$ is a hydrogen atom or a C$_1$-C$_4$ alkyl group; R$^4$ is a C$_1$-C$_4$ alkyl group; Q is a group of the formula: —C$_2$H$_4$O— or —CH(CH$_3$)CH$_2$O—; n is an integer of 6 to 22; m is an integer of 1 to 10; and X is a hydrogen atom, an alkali metal atom or an ammonium group.

4. An etchant composition according to claim 3, wherein the fluorine-containing surfactant is at least one anionic one selected from the group consisting of RfCOOX and RfSO$_3$X wherein Rf is a C$_4$-C$_{10}$ perfluoroalkyl or ω-hydroperfluoroalkyl group, and X is the same as defined above.

5. An etchant composition according to claim 4, wherein the anionic surfactant is one selected from the group consisting of
   H(CF$_2$CF$_2$)$_3$COOH,
   H(CF$_2$CF$_2$)$_3$COONH$_4$,
   C$_8$F$_{17}$SO$_3$H, and
   C$_8$F$_{17}$SO$_3$NH$_4$.

6. An etchant composition according to claim 1, wherein the amount of the surfactant is from 0.00001 to 10% by weight based on the weight of the etchant composition.

7. An etchant composition according to claim 1, wherein the cerium (IV) salt is at least one selected from the group consisting of cerium (IV) sulfate, cerium (IV) nitrate, ammonium cerium (IV) sulfate and ammonium cerium (IV) nitrate.

8. An etchant composition according to claim 1, wherein the amount of the cerium (IV) salt to be added in the etchant composition is from 10 to 300 g per liter of water.

9. An etchant composition according to claim 1, wherein the amount of the acid component to be added is up to 120 g per liter of water.

* * * * *